United States Patent
Klop

(10) Patent No.: US 8,662,569 B2
(45) Date of Patent: Mar. 4, 2014

(54) DUAL TORQUE ACTIVE GRILLE SHUTTER FOR SNOW AND ICE

(75) Inventor: Aaron Peter Klop, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 13/270,312

(22) Filed: Oct. 11, 2011

(65) Prior Publication Data

US 2013/0086839 A1   Apr. 11, 2013

(51) Int. Cl.
*B60K 11/08*   (2006.01)
(52) U.S. Cl.
USPC ........................ 296/193.1; 180/68.1
(58) Field of Classification Search
USPC ............... 296/193.1, 208; 293/115; 180/68.1, 180/68.2, 68.3, 68.4, 68.6
See application file for complete search history.

(56) References Cited

U.S. PATENT DOCUMENTS

| | | | | |
|---|---|---|---|---|
| 5,912,538 | A * | 6/1999 | Turner | 318/280 |
| 6,588,380 | B2 * | 7/2003 | Ries-Mueller | 123/41.05 |
| 6,758,193 | B1 | 7/2004 | Kincaid | |
| 7,434,565 | B2 * | 10/2008 | Miyachi | 123/399 |
| 7,766,111 | B2 * | 8/2010 | Guilfoyle et al. | 180/68.1 |
| 7,866,737 | B2 * | 1/2011 | Browne et al. | 296/193.1 |
| 8,161,919 | B2 * | 4/2012 | Klotz et al. | 123/41.04 |
| 8,316,974 | B2 * | 11/2012 | Coel et al. | 180/68.1 |
| 2002/0153182 | A1 | 10/2002 | Vaillancourt et al. | |
| 2003/0101947 | A1 | 6/2003 | Ries-Mueller | |
| 2008/0082244 | A1 * | 4/2008 | Watanabe et al. | 701/71 |
| 2009/0212598 | A1 | 8/2009 | Otterstrom | |
| 2010/0282533 | A1 * | 11/2010 | Sugiyama | 180/68.1 |

FOREIGN PATENT DOCUMENTS

DE  102007008240  11/2007

* cited by examiner

*Primary Examiner* — Jason S Morrow
*Assistant Examiner* — E Turner Hicks
(74) *Attorney, Agent, or Firm* — Raymond L. Coppiellie; Brooks Kushman P.C.

(57) ABSTRACT

An active grille shutter system comprising a controller, a sensor provides a freeze signal to the controller when a temperature is near or below freezing, and an electric motor that opens and closes a plurality of vanes. The motor receives a low current signal from the controller to operate the system at a first torque level and receives a high current signal to operate the system at a second torque level when the controller receives the freeze signal. A precipitation signal from the windshield wiper system of the vehicle is provided to the controller to provide an indication that there is precipitation present in the vehicle environment. The controller may provide the high current signal to the motor only when the freeze signal and the precipitation signal are provided to the controller. A method is also provided for operating the system.

9 Claims, 2 Drawing Sheets

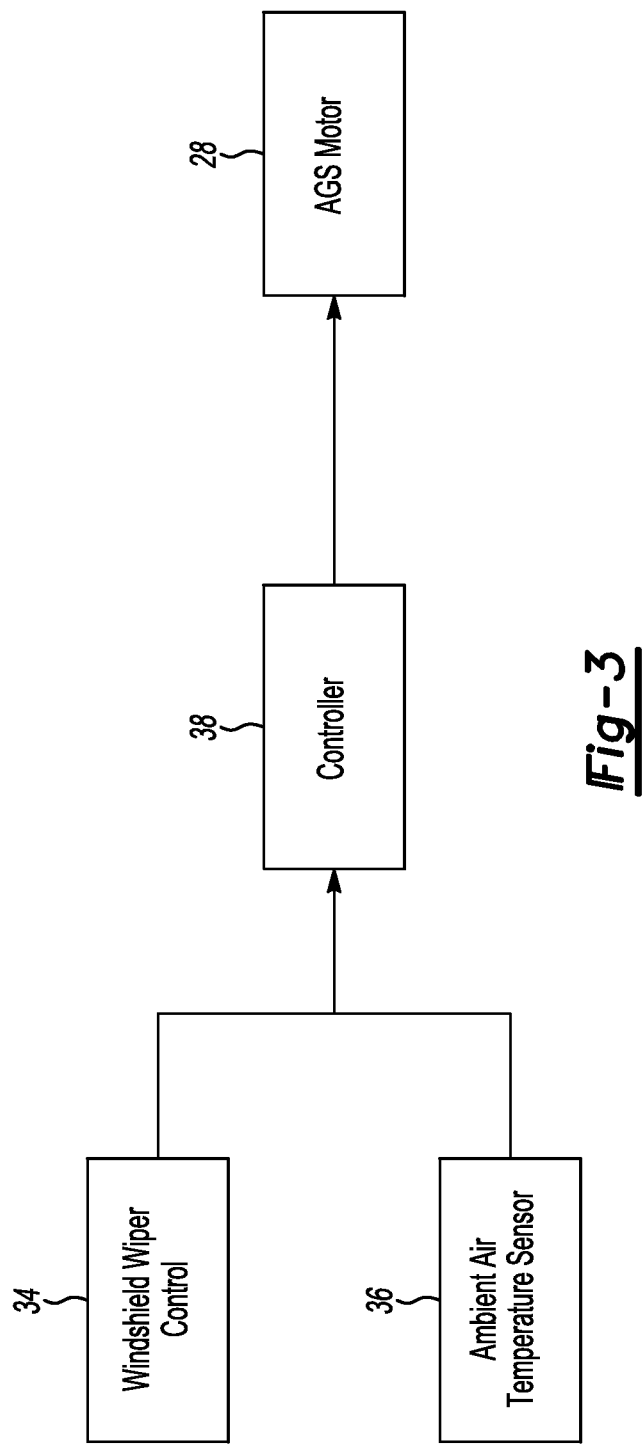

DUAL TORQUE ACTIVE GRILLE SHUTTER FOR SNOW AND ICE

TECHNICAL FIELD

This disclosure relates to operating controls and actuators for active grille shutters that open to provide air flow to the engine compartment of a vehicle and that close to provide better aerodynamics and improved fuel efficiency for a vehicle.

BACKGROUND

Vehicle grilles are provided to direct airflow into the engine compartment of a vehicle when the vehicle is driven. Closing the vanes of the grille may also be advantageous, provided that adequate cooling airflow is provided to the engine compartment, to reduce aerodynamic drag and improve fuel economy. Under some conditions, such as when the ambient air and engine are cold, it may be advantageous to reduce airflow into the engine compartment to allow the engine to warm more quickly and provide warm air sooner through the heating and air conditioning system.

Active grille shutters are operated by an electric motor that drives a gear set. Snow and ice may build-up on movable vanes and impede operation of the active grille shutter and may become inoperable. Active grille shutters are most susceptible to freezing when in a fully closed state at or about freezing temperatures and when they are subjected to freezing rain or snow.

This disclosure is directed to addressing the above problems and other problems relating to the operation of an active grille shutter system.

SUMMARY

According to one aspect of this disclosure, a dual torque actuator is provided that applies greater force for operation of the active grille shutter system when conditions are favorable for the accumulation of ice and snow on the movable vanes of the active grille shutter. The increased force applied by the actuator is used to break away accumulated ice and snow and assures unimpeded operation of the system.

The use of an actuator that applies increased force at elevated temperatures may reduce the cycle life of plastic parts of the system. In particular, using an electric motor that provides sufficient torque to break away snow and ice accumulations to drive a plastic gear set that moves the vanes may damage the gear set when operated at higher temperatures. The proposed dual torque actuator may be an electric motor that is provided with an increased current level when conditions are favorable for the build-up of snow and ice and a decreased current level otherwise. At lower torque levels wear on plastic parts is reduced and may assure a longer life cycle for the system.

The active grille shutter system is controlled by a control module that provides two different signals to the system depending upon vehicle operating conditions. High current may be provided when conditions favor accumulation of snow and ice. Lower current may be provided at other times. The control module may be the engine powertrain control module (PCM). The PCM may receive signals from an ambient temperature sensor when the temperature is slightly above or is below freezing that cause the controller to generate the high current signal. The PCM may also receive a signal from the windshield wiper system when the windshield wipers are actuated that indicates that there is precipitation or moisture from the road that favors the accumulation of ice and snow. Other inputs to the controller may also be provided to the PCM that may indicate potential freezing conditions.

According to one aspect of the disclosure, an active grille shutter system is provided that comprises a controller, a temperature sensor that provides a freeze signal to the controller when the ambient temperature is near or below freezing, and an actuator that opens and closes a plurality of vanes at a first level of force and applies a second level of force in response to a signal from the controller when the controller receives the freeze signal.

According to other aspects of the active grille shutter embodiment, the actuator may be an electric motor. The signal from the controller may be a higher current signal than a low current signal that operates the vanes at the first level of force. The controller may receive a signal from the windshield wiper system of the vehicle to provide an indication that there is precipitation present in the vehicle environment when the ambient temperature signal is also provided to the controller as a condition of generating the higher current signal.

According to another aspect of the disclosure an active grille shutter (AGS) system is provided that comprises a controller, that a sensor provides a freeze signal to the controller when a temperature is near or below freezing, and an electric motor that opens and closes the AGS system. The motor receives a low current signal from the controller to operate the system at a first force level and receives a high current signal to operate the system at a second level of force when the controller receives a freezing condition signal.

According to other aspects of the grill shutter system, a plurality of vanes and a gear set are provided to drive the vanes to open and close the system. The first force level is a first level of torque provided by the motor and the second level of force is a second level of torque provided by the motor. A precipitation signal may be provided from the windshield wiper system of the vehicle to the controller to provide an indication that there is precipitation present in the vehicle environment. The controller may be programmed to provide the high current signal only when the freeze signal and the precipitation signal are provided to the controller.

According to another aspect of the disclosure a method of operating an active grille shutter system is disclosed that comprises sensing an ambient temperature and providing a freeze signal to a controller when the ambient temperature is below a threshold temperature value. A first level of force is applied to an actuator to shift a plurality of vanes between an open position and a closed position. A second level of force is applied to the actuator in response to the controller receiving the freeze signal to shift a plurality of vanes between an open position and a closed position.

According to additional aspects of the disclosed method, the actuator may be an electric motor that receives the signal from the controller that is a higher current signal than a low current signal that operates the vanes at the first level of force. The method of operating the active grille shutter system may further comprise providing a moisture signal from the windshield wiper system of the vehicle that is provided to the controller to provide an indication that there is precipitation present in the vehicle environment. The controller receives the moisture signal as a condition for applying the second level of force in response to the signal from the controller.

The above aspects of the disclosure and other aspects will be better understood in view of the attached drawings and the following detailed description of the illustrated embodiments of the disclosure.

BRIEF DESCRIPTION OF THE DRAWINGS

FIG. 3 is a simplified flow chart of a control system for a vehicle that is provided with an active grille shutter system.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the present invention.

Figure 1:
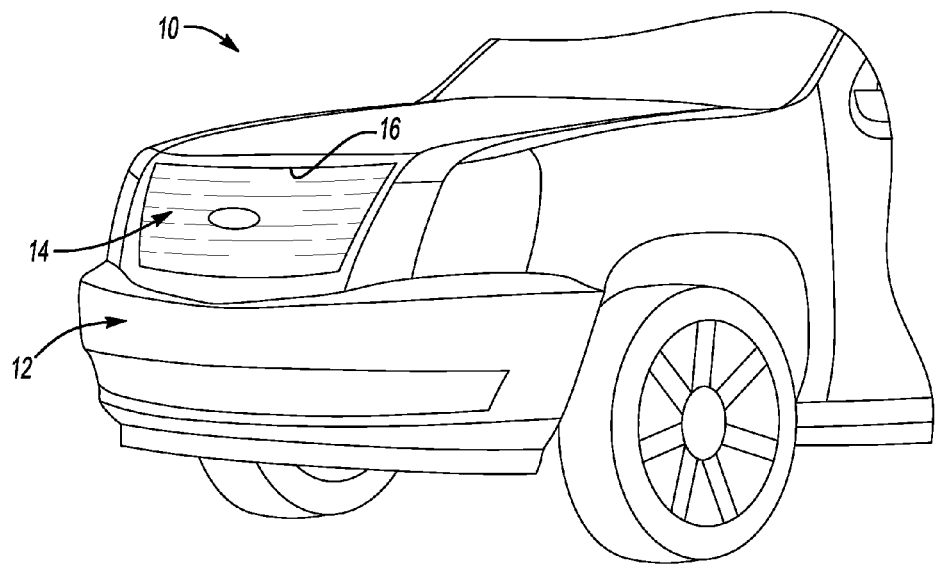
FIG. 1 is a side elevation view of a vehicle that is provided with an active grille shutter system.

Referring to FIG. 1, a vehicle is generally indicated by reference numeral 10. In the front end 12 of the vehicle 10, a grille 14 is shown covering a grille opening 16.

Figure 2:
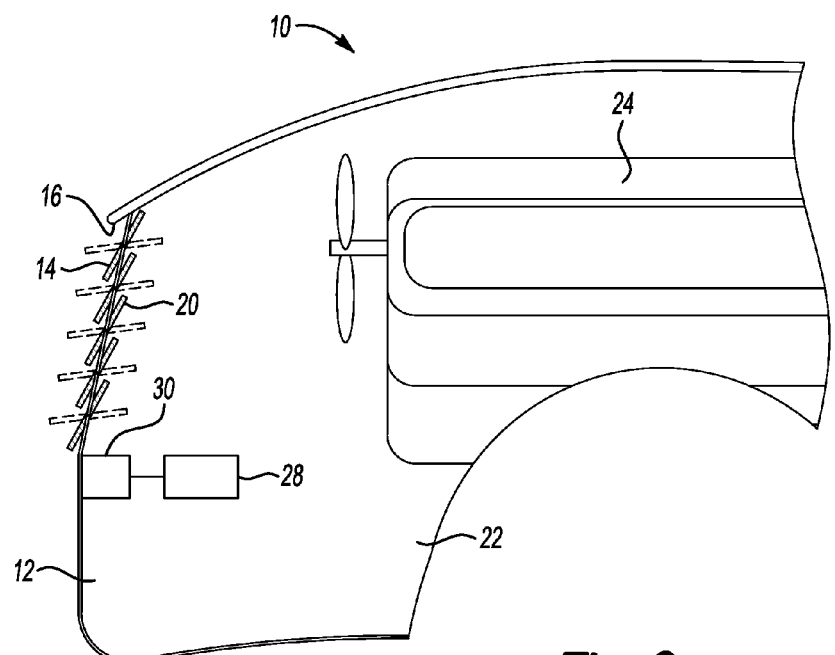
FIG. 2 is a fragmentary diagrammatic cross-sectional view of a vehicle that is provided with an active grille shutter system.

Referring to FIG. 2, a front end 12 of the vehicle 10 is diagrammatically shown to illustrate the active grille shutter (AGS) with the grille 14 being shown in a closed position in solid lines and an open position in phantom lines. The vanes 20 of the grille are shown in a closed position in solid lines and in phantom lines in the open position. When the grille 14 is open, maximum air flow is provided into the engine compartment 22 through the vanes 20. To improve fuel economy, the vanes 20 may be closed, as shown in solid lines, to direct air more aerodynamically over the vehicle 10. An engine 24 is shown in the engine compartment 22 that has components that require cooling and protection from excessive heat in the engine compartment 22. The vanes 20 may be closed to improve heater performance by allowing heat to build up within the engine compartment. As the engine coolant warms in cold temperatures, heat from the coolant is provided to the HVAC system of the vehicle as is well known in the art. While FIG. 2 illustrates an engine in the engine compartment, the active grille shutter system may also be used in conjunction with a battery-powered, fuel cell or hybrid vehicle to optimize operation of such systems to the extent that they are also affected by temperature within the compartment 22.

A motor 28 opens and closes the vane 20 and operates in conjunction with a gear reducer or gear set 30. The motor 28 is an electric motor that is operable to provide at least two levels of torque through the gear set 30. When the ambient temperature is above freezing, the motor 28 may be provided with one level of current and provides a low level of torque. At the low level of motor torque, the gears within the gear set 30 are subjected to a lower level of torque and can be expected to provide a relatively long cycle life in endurance testing and in actual use. Moisture in the form of precipitation or from the road may freeze and build up on the vanes 20 when the ambient temperature is near freezing or below. A build-up of ice or snow on the vanes 20 may cause the vanes to become stuck. If the vanes 20 become stuck in the closed position, insufficient air may be provided to the engine compartment 22 to properly cool the engine 24 and its associated component parts. The motor 28 may be provided with higher current to provide an increased level of torque to the gear set 30 that is effective to overcome the build-up of ice and show on the vanes 20 and permit them to freely open and close in severe weather conditions.

Referring to FIG. 3, a simplified control system is shown for an activated grille shutter motor 28. A windshield wiper control may provide a signal along with an ambient air temperature sensor 36 to the controller 38. When the ambient air temperature senses an air temperature at a threshold temperature value that is below or near freezing, the signal sent to the controller may be used to cause the controller to send a higher current signal to the AGS motor 28 to assure that ice and snow will not build up and cause the vanes 20 (shown in FIG. 2) to become stuck in one position.

The windshield wiper control 34 may also provide a signal to the controller to indicate whether a sufficient level of moisture in the form of precipitation or spray from other vehicles on the road that would indicate the presence of sufficient moisture to cause ice to build up on the vanes 20.

The controller 38 normally provides a lower level of current to the AGS motor 28 and is controlled based upon another control algorithm, such as that disclosed in co-pending application Ser. No. 13/205,907, filed Aug. 9, 2011. The disclosure of the control algorithm is hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active grille shutter system for a vehicle having a wiper control comprising:
    a controller;
    a temperature sensor provides a freeze signal to the controller when an ambient air temperature in a vehicle environment is near or below freezing;
    a moisture signal from the wiper control is provided to the controller to provide an indication that there is moisture present in the ambient air; and
    an actuator opens and closes a plurality of vanes at a first level of force and applies a second level of force in response to a signal from the controller when the controller receives the freeze signal and the moisture signal.

2. The active grille shutter system of claim 1 wherein the actuator is an electric motor.

3. The active grille shutter system of claim 2 wherein the signal from the controller is a higher current signal than a low current signal that operates the vanes at the first level of force.

4. A grille shutter system for a vehicle having a wiper control comprising:
    a controller;
    a sensor provides a freeze signal to the controller when an ambient air temperature in a vehicle environment is near or below freezing;
    a moisture signal from the wiper control is provided to the controller to provide an indication that there is moisture present in the ambient air;
    an electric motor opens and closes the system, the motor receives a low current signal from the controller to operate the system at a first force level and receives a high current signal to operate the system at a second level of force when the controller receives the freeze signal and the moisture signal.

5. The grill shutter system of claim 4 further comprising a plurality of vanes and a gear set that drives the vanes to open and close the system.

6. The grill shutter system of claim 4 wherein the first force level is provided by a first level of torque provided by the motor and the second level of force is a second level of torque provided by the motor.

7. A method of operating an active grille shutter system for a vehicle with a wiper control comprising:
- sensing an ambient temperature;
- providing a freeze signal to a controller when the ambient temperature is below a threshold temperature value;
- providing a moisture signal from the wiper control to the controller to provide an indication that there is moisture present in the ambient air;
- applying a first level of force to an actuator to shift a plurality of vanes between an open position and a closed position; and
- applying a second level of force to the actuator in response to the controller receiving the freeze signal and the moisture signal to shift a plurality of vanes between an open position and a closed position.

8. The method of operating the active grille shutter system of claim 7 wherein the actuator is an electric motor.

9. The method of operating the active grille shutter system of claim 8 wherein the signal from the controller is a higher current signal than a low current signal that operates the vanes at the first level of force.

* * * * *